(12) United States Patent
Campbell et al.

(10) Patent No.: US 11,362,335 B2
(45) Date of Patent: Jun. 14, 2022

(54) COATED SULFUR PARTICLE ELECTRODE AND METHOD

(71) Applicant: The Regents of the University of California, Oakland, CA (US)

(72) Inventors: Brennan Campbell, Reno, NV (US); Jeffrey Bell, Northridge, CA (US); Hamed Hosseini Bay, Arlington, MA (US); Zachary Favors, Corona, CA (US); Cengiz S Ozkan, San Diego, CA (US); Mihrimah Ozkan, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 98 days.

(21) Appl. No.: 15/550,741

(22) PCT Filed: Feb. 12, 2016

(86) PCT No.: PCT/US2016/017850
§ 371 (c)(1),
(2) Date: Aug. 11, 2017

(87) PCT Pub. No.: WO2016/130980
PCT Pub. Date: Aug. 18, 2016

(65) Prior Publication Data
US 2018/0034059 A1    Feb. 1, 2018

Related U.S. Application Data

(60) Provisional application No. 62/115,853, filed on Feb. 13, 2015.

(51) Int. Cl.
*H01M 4/62* (2006.01)
*H01M 10/0525* (2010.01)
(Continued)

(52) U.S. Cl.
CPC ......... *H01M 4/628* (2013.01); *H01M 4/0433* (2013.01); *H01M 4/139* (2013.01);
(Continued)

(58) Field of Classification Search
CPC ..................................................... H01M 4/366
See application file for complete search history.

(56) References Cited

U.S. PATENT DOCUMENTS 5,278,208 A     1/1994  Palmer et al.
7,491,852 B1 *  2/2009  Chou ..................... C07C 45/38
                                                        568/403
(Continued)

FOREIGN PATENT DOCUMENTS

CN        1285086 A       2/2001
CN      103000864 A       3/2013
(Continued)

OTHER PUBLICATIONS

"European Application Serial No. 16750006.5, Office Action dated Oct. 5, 2017", 2 pgs.
(Continued)

*Primary Examiner* — Stephan J Essex
(74) *Attorney, Agent, or Firm* — Schwegman Lundberg & Woessner, P.A.

(57) ABSTRACT

A coated sulfur particle and methods are shown. In one example, the coated sulfur particles are used as an electrode in a battery, such as a lithium ion battery.

7 Claims, 7 Drawing Sheets (51) Int. Cl.
| | |
|---|---|
| *H01M 4/04* | (2006.01) |
| *H01M 4/36* | (2006.01) |
| *H01M 4/38* | (2006.01) |
| *H01M 10/052* | (2010.01) |
| *H01M 4/139* | (2010.01) |
| *H01M 4/13* | (2010.01) |

(52) U.S. Cl.
CPC ............ *H01M 4/366* (2013.01); *H01M 4/38* (2013.01); *H01M 4/382* (2013.01); *H01M 4/62* (2013.01); *H01M 4/625* (2013.01); *H01M 10/052* (2013.01); *H01M 10/0525* (2013.01); *H01M 4/13* (2013.01); *H01M 2220/20* (2013.01); *H01M 2220/30* (2013.01); *Y02T 10/70* (2013.01)

(56) References Cited

U.S. PATENT DOCUMENTS

| | | | |
|---|---|---|---|
| 2009/0162750 | A1 | 6/2009 | Kawakami et al. |
| 2012/0207994 | A1 | 8/2012 | Wang et al. |
| 2013/0065128 | A1 | 3/2013 | Li et al. |
| 2013/0266859 | A1* | 10/2013 | Todoriki ............... H01M 4/625 429/211 |
| 2016/0149261 | A1* | 5/2016 | Zaghib ................. H01M 4/136 429/94 |

FOREIGN PATENT DOCUMENTS

| | | | |
|---|---|---|---|
| CN | 103682280 | A | 3/2014 |
| CN | 104183834 | A * | 12/2014 |
| CN | 104183834 | A | 12/2014 |
| CN | 107431174 | B | 11/2021 |
| EP | 3257094 | B1 | 9/2019 |
| JP | 2001527276 | A | 12/2001 |
| JP | 6873039 | B2 | 4/2021 |
| WO | WO-2013096753 | A1 | 6/2013 |
| WO | WO-2014201568 | A1 | 12/2014 |
| WO | WO-2016130980 | A1 | 8/2016 |

OTHER PUBLICATIONS

"European Application Serial No. 16750006.5, Response filed Apr. 12, 2018 to Communication pursuant to Rules 161(2) and 162 EPC dated on Oct. 5, 2017", 11 pgs.

"International Application Serial No. PCT/US2016/017850, International Preliminary Report on Patentability dated Aug. 24, 2017", 7 pgs.

Campbell, Brennan, et al., "$SiO_2$-coated sulfur particles with mildly reduced graphene oxide as a cathode material for lithium-sulfur batteries", *Nanoscale*, 7, (2015), 7051-7055.

"European Application Serial No. 16750006.5, Extended European Search Report dated Jul. 6, 2018", 8 pgs.

Velikov, "Synthesis and characterization of monodisperse core-shell colloidal spheres of zinc sulfide and silica", Langmuir v17, (2001), 4779-4786.

European Application Serial No. 16750006.5, Response Filed Feb. 4, 2019 to Extended European Search Report dated Jul. 6, 2018, 16 pgs.

International Application Serial No. PCT/US2016/017850, International Search Report and Written Opinion dated May 2, 2016, 7 pgs.

Kobayashi, et al., "Control of shell thickness in silica-coating of Au nanoparticles and their X-ray imaging properties", Journal of Colloid and Interface Science, [Online], Retrieved from the Internet:<DOI:10.1016/j.jcis.2011.01.058>, (Jun. 15, 2011), 329-333.

Li, W, et al., "High-performance hollow sulfur nanostructured battery cathode through a scalable,room temperature, one-step, bottom-up approach", Proceedings of the National Academy of Sciences of the United States of America vol. 110,issue 18, [Online], Retrieved from the Internet:<DOI: 10.1073/pnas.1220992110, (Apr. 30, 2013), 7148-7153.

Yin, L, et al., "Dual-mode sulfur-based cathode materials for rechargeable Li—S batteries", Chemical Communications vol. 48 issue 63, [Online], Retrieved from the Internet:<DOI:10.1039/c2cc33333c>, (Jun. 21, 2012), 7868-7870.

Chinese Application Serial No. 201680021313.2, Office Action dated Apr. 9, 2020, w/ English Translation, 12 pgs.

Chinese Application Serial No. 201680021313.2, Office Action dated Jul. 24, 2020, w/ English translation, 12 pgs.

Chinese Application Serial No. 201680021313.2, Response filed Mar. 12, 2020 to Office Action dated Sep. 2, 2019, w/ English Claims, 10 pgs.

Chinese Application Serial No. 201680021313.2, Response filed Jun. 9, 2020 to Office Action dated Apr. 9, 2020, w/ English Claims, 11 pgs.

Japanese Application Serial No. 2017-542042, Final Notification of Reasons for Refusal dated Jul. 7, 2020, w/ English Translation, 10 pgs.

Japanese Application Serial No. 2017-542042, Response filed Jan. 22, 2020 to Notification of Reasons for Refusal dated Oct. 23, 2019, w/ English Claims, 11 pgs.

Hailiang, Wang, "Graphene-Wrapped Sulfur Particles as a Rechargeable Lithium Sulfur Battery Cathode Material with High Capacity and Cycling Stability", (06242011), 4 pgs.

Chinese Application Serial No. 201680021313.2, Office Action dated Mar. 3, 2021, w/English Translation, 17 pgs.

Chinese Application Serial No. 201680021313.2, Response filed Dec. 8, 2020 to Office Action dated Jul. 24, 2020, w/ English claims, 10 pgs.

Japanese Application Serial No. 2017-542042, Response filed Dec. 23, 2020 to Final Notification of Reasons for Refusal dated Jul. 7, 2020, w/ English Claims, 9 pgs.

Chinese Application Serial No. 201680021313.2, Office Action dated Sep. 2, 2019, w/ English Translation, 14 pgs.

Japanese Application Serial No. 2017-542042, Notification of Reasons for Refusal dated Oct. 23, 2019, w/ English Translation, 10 pgs.

Chinese Application Serial No. 201680021313.2, Response filed May 14, 2021 to Office Action dated Mar. 3, 2021, with English claims, 12 pages.

* cited by examiner

COATED SULFUR PARTICLE ELECTRODE AND METHOD

RELATED APPLICATION

This application is a U.S. National Stage Filing under 35 U.S.C. 371 from International Application No. PCT/US2016/017850, filed on Feb. 12, 2016, and published as WO 2016/130980 A1 on Aug. 18, 2016, which claims priority to U.S. Provisional Patent Application No. 62/115,853, entitled "COATED SULFUR PARTICLE ELECTRODE AND METHOD," filed on Feb. 13, 2015, each of which is incorporated herein by reference in its entirety.

TECHNICAL FIELD

This invention relates to lithium-ion battery electrodes containing sulfur and methods. In one example, this invention relates to coated sulfur particles.

BACKGROUND

Improved batteries, such as lithium ion batteries are desired. One example of a battery structure that can be improved is an electrode structure.

DETAILED DESCRIPTION

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

$SiO_2$-coated sulfur particles (SCSPs) are shown fabricated via a two-step wet chemical process for application as a lithium-sulfur cathode material. With the addition of a graphene oxide, for example, mildly reduced graphene oxide (mrGO), SCSPs demonstrate even greater cycling stability, maintaining over 700 $mAhg^{-1}$ after the $50^{th}$ cycle.

The invention of rechargeable lithium-ion (Li-ion) battery technology has set the newest paradigm in energy storage over the last several decades. These batteries are becoming well-developed, and have been responsible for powering portable phones, computers, and electric vehicles. While Li-ion battery cathodes presently have a capacity range of 150-200 $mAhg^-$, the theoretical capacity of lithium-sulfur (Li—S) cathodes is 1675 $mAhg^-$, and recent research shows that hundreds of cycles at specific capacities of over 700 $mAhg^{-1}$ is possible. Li—S batteries show great promise in meeting the critical need for EV batteries with high specific capacity, both volumetric and gravimetric. The Li—S system offers other advantages as well; the elements lithium and sulfur offer a relatively low-cost battery due to their light weight and relatively high abundance.

The number of new Li—S battery publications in recent years is growing exponentially, showing the increased interest in addressing the problems with Li—S batteries. However, challenges with the Li—S battery include the low electronic conductivity of sulfur ($5 \times 10^{-30}$ S $cm^{-1}$ at 25° C.), poor ionic diffusivity, volumetric expansion during lithiation (~80%), and the polysulfide "shuttle" effect, in which the intermediate lithium polysulfides ($Li_2Sn$, $4 \leq n \leq 8$) dissolve into the electrolyte.

Recently, other materials have been introduced into sulfur cathodes, many of which have properties that enhance cathode performance in ways that carbon cannot. For instance. $TiO_2$ and several other oxide nanostructures have been demonstrated as beneficial additions to sulfur cathodes, due to their inertness to redox reactions and extraordinary polysulfide adsorbing properties. In many cases $SiO_2$ is termed a "polysulfide reservoir," wherein SBA-15 mesoporous silica was used as an additive in a mesoporous carbon/sulfur composite for a lithium-sulfur cathode structure. In one example a small amount of $SiO_2$ additive is used for trapping polysulfides and then readily desorbing them during electrochemical reduction/oxidation. In addition, the increased stability shown in the cycling of this cathode composite is attributed to the mesoporous structure of the $SiO_2$, inhibiting diffusion of the polysulfide anions. Besides $SiO_2$, other oxides have been shown to stabilize soluble polysulfide species, including $Al_2O_3$ and $La_2O_3$, often incorporated into nanocomposites with graphene or graphene oxide (GO). The battery performance of a sulfur-silica core-shell structure has, until now, yet to be explored.

The present disclosure shows the facile wet synthesis of $SiO_2$-coated sulfur particles (SCSPs), and assess this novel material as a possible Li—S battery cathode. The general synthesis of SCSPs is outlined in FIG. 1, and the synthesis was performed as follows: A 100 mL aqueous solution of $Na_2S_2O_3 \cdot 5H_2O$ (1 g) and polyvinylpyrrolidone (PVP) (20 mg, 55,000 MW), an amphiphilic surfactant polymer, was prepared.

Figure 1:
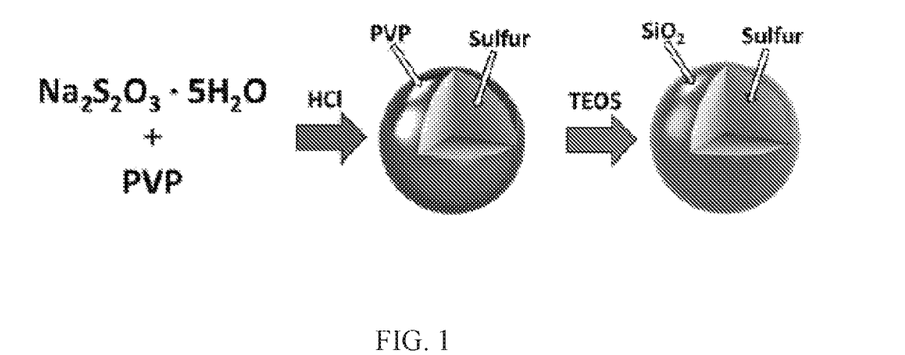
FIG. 1 shows wet chemical synthesis according to an example of the invention.

FIG. 1 shows a schematic illustration of the two-step wet chemical synthesis of SCSPs, showing the starting materials sodium thiosulfate pentahydrate and PVP (a), the formation of PVPCSPs after HCl addition (b) and finally the SCSPs after addition of TEOS.

While mildly stirring the solution, 0.80 mL concentrated HCl was added dropwise. The reaction requires two hours for completion, although a white cloudy precipitate can be observed almost instantly. During this time, thiosulfate ions decompose into elemental sulfur (Ss), which forms particles that are coated with PVP. After two hours, the contents of the reaction vessel were centrifuged for 10 minutes at 3.6 krpm, and resuspended in a 0.05 wt % solution of PVP. The suspension was again centrifuged for 10 minutes at 3.6 krpm, and this wash/centrifuge process was done two more times using deionized water (DI $H_2O$). The washed PVP-coated sulfur particles (PVPCSPs) were suspended in 20 mL DI $H_2O$ and set aside. Next, a modified Stöber process was used to coat the sulfur particles with silica ($SiO_2$). In this process, a solution of tetraethyl orthosilicate (TEOS) was first prepared by adding 20 uL TEOS to 20 mL methanol (MeOH). In a flask, 60 mL MeOH and 2 mL 30% ammonia ($NH_3$) were combined and stirred vigorously. While stirring, the 20 mL PVPCSP suspension was transferred dropwise to the $NH_3$ solution. The TEOS solution was then added to the reaction vessel dropwise, adding 5 mL every 30 minutes until there was no remaining TEOS solution. The reaction was stirred for 17 hours, then centrifuged and washed several times with DI $H_2O$ and isopropyl alcohol (IPA). IN one example, the reaction was optimized to these conditions by varying ageing time for the Stöber process (12-24 hours), and the amount of TEOS added (10-30 µL).

For addition of graphene oxide, for example, mildly reduced graphene oxide (mrGO), a method such as Hummer's method was first used to prepare graphene-oxide (GO). Next, 20 mg SCSPs were suspended in 10 mL ethanol (EtOH), and was kept stirring. A separate suspension of 6 mg GO in 3 mL DI $H_2O$ was also prepared, and then slowly added to the SCSP suspension while stirring. The reaction vessel was then placed in an ice bath, and 16 µL hydrazine was added for the partial reduction. This reaction was allowed to stir at 0° C. for 24 hours, after which the product was washed repeatedly with DI $H_2O$ and dried under vacuum for 24 hours at 60° C.

Figure 2:
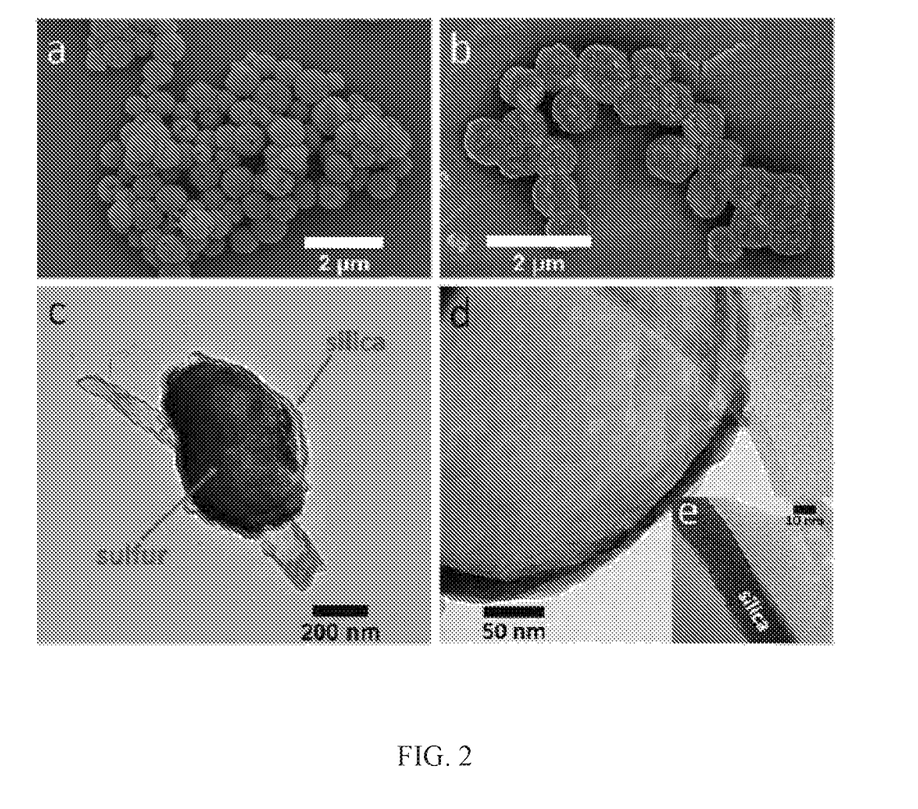
FIG. 2 shows SEM images of coated particles according to an example of the invention.

Morphologies of the PVPCSPs and SCSPs were studied using scanning electron microscopy (SEM), and are seen in FIGS. 2a and 2b. FIG. 2 shows SEM images of PVP-coated sulfur particles (a), SCSPs (b), and TEM images of an isolated SCSP, showing the amorphous $SiO_2$ coating, from low to high magnification (c-e).

In FIG. 2a, PVPCSPs are shown to have a spherical shape, with a diameter of about 700-800 nm. Some smaller particles also tend to form during the synthesis is most likely due to small changes in reaction conditions. Under the SEM beam, the PVP coatings distort, revealing their core-shell type structure. FIG. 2b exhibits the SCSPs on an aluminum substrate. The diameter of the SCSPs are generally greater than the PVPCSPs, while the $SiO_2$ coatings appear bumpy and somewhat uneven at the surface.

This uneven surface is possibly attributed to a degree of compositional inhomogeneity in the deposited silica coatings. As a consequence, many SCSPs tend to assume a potato-like morphology rather than a perfect spherical morphology, although most tend to remain relatively spherical. Besides the bumps on the surface, we see from TEM analysis in FIG. 2 that the $SiO_2$ renders as a thin film on the surface of the sulfur particles.

FIG. 2c captures a smaller potato-shaped SCSP, differentiating the sulfur core from the $SiO_2$ shell. The particle is resting on top of a $SiO_2$ nanotube, which tend to form when there is excess PVP that carries over from the PVPCSP synthesis. TEM of the silica shell is shown in FIG. 2d, allowing a view of the continuous coating without sulfur. This image is the results of the electron beam causing the sulfur to react and escape the structure, giving valuable information about the shell alone. HRTEM on the silica shell (FIG. 2e) confirms that the silica is amorphous. On average, the thickness of the $SiO_2$ shell is about 20 nm, although the thickness increases near the bumps.

The amorphous nature of the $SiO_2$ coating was also confirmed with HRTEM in FIG. 2e. Evidently, there is a relatively high degree of control over the size and morphology of the novel SCSP material, making it an ideal system to electrochemically characterize as a Li—S cathode material.

Figure 3A:
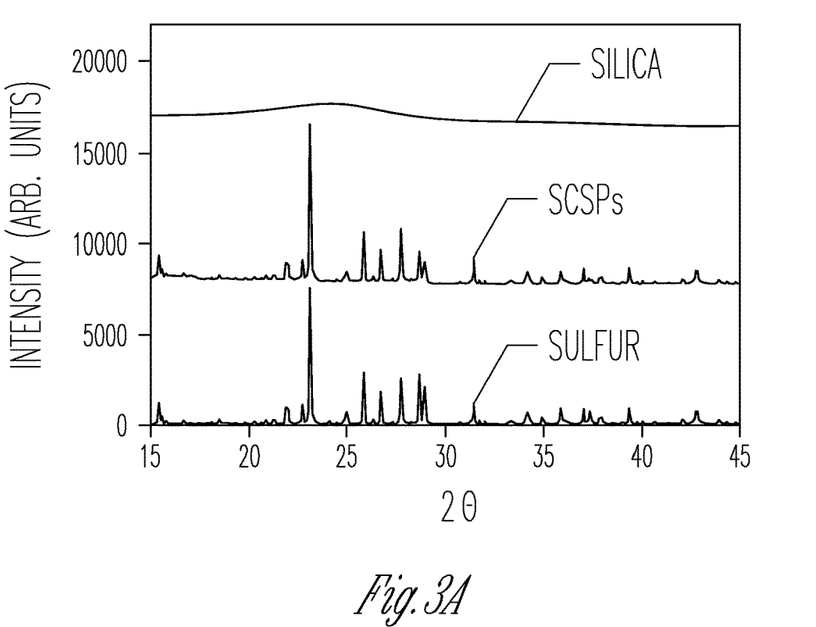
FIG. 3 shows characterization data of particles according to an example of the invention.

Furthermore, point ID energy dispersive x-ray spectroscopy (EDS) confirmed the presence of both elemental sulfur and silica in SCSPs, while the prevailing presence of sulfur with respect to silica in the SCSP cathode is evidenced by the XRD spectrum of SCSPs in comparison to amorphous $SiO_2$ and sulfur, seen in FIG. 3a. The Al peak in EDS results from the aluminum substrate used to prevent skewing of the presence of Si. FIG. 3 shows spectral data including XRD of amorphous silica, SCSPs, and elemental sulfur (a) and EDS of SCSPs, including corresponding relative weight percentages (b).

The amorphous thin-layer $SiO_2$ shell surrounding the sulfur cores presumably inhibits the polysulfide shuttle effect, acting as an adsorbent barrier and polysulfide reservoir. The polysulfide shuttle effect tends to hinder typical carbon-sulfur cathode structures and they may experience active material loss. $SiO_2$ has the inherent ability to surface-adsorb polysulfide species that are soluble in the electrolyte, which deters the loss of electrochemically active sulfur over numerous cycles. In this design, the $SiO_2$ shell carries out this task, while allowing $Li^+$ diffusion. During battery fabrication we have found that, rather than solely including carbon black (CB) as a conductive additive, the addition of mildly reduced graphene oxide (mrGO) significantly improves the cyclability of the cathode, boosting its discharge capacity by over 300 $mAhg^{-1}$ after 50 cycles.

A graphene oxide, such as mrGO was chosen for the cathode composite due to its ability to wrap its sheets around particles and form a more interconnected conductive network. CB alone may not provide this conductive sink, which poses a problem for this cathode material composed of one insulator (sulfur) coated with another insulator ($SiO_2$). As the structure becomes damaged over time, the mrGO acts as a conductive net, contains the structures, and also has polysulfide-trapping properties. Thus, there are several modes of action by which the addition of mrGO helps to improve the cycle stability of SCSPs.

Figure 4A:
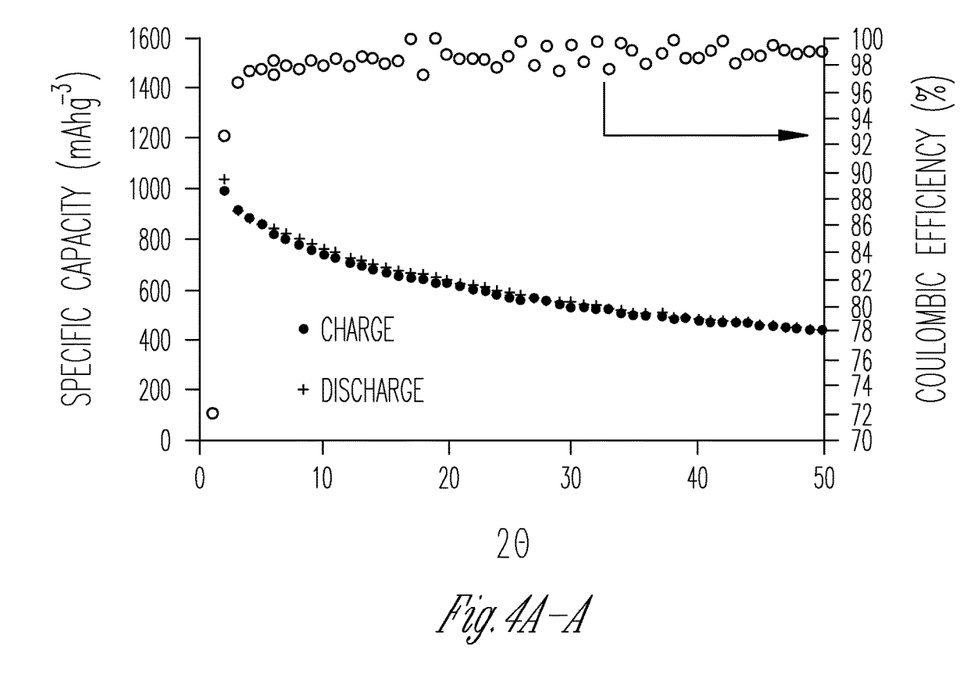
FIG. 4A shows electrical performance data of batteries using particles according to an example of the invention.
Figure 4B:
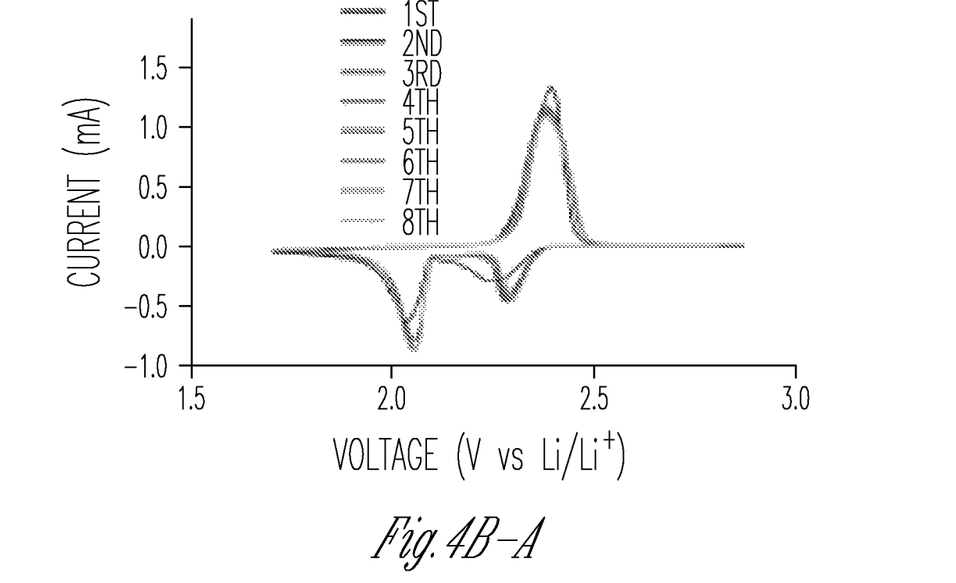
FIG. 4B shows additional electrical performance data of batteries using particles according to an example of the invention.

FIG. 4A shows Cyclability plots for SCSPs (a) and for SCSPs with mrGO as an additive (b), and the discharge cycle capacity comparison of SCSPs with and without mrGO to 50 cycles (c). FIG. 4B shows Cyclic voltammetry for SCSPs (a) and for SCSPs with mrGO as an additive (b), and voltage profiles of SCSPs (c) and SCSPs with mrGO (d).

Figure 3B:
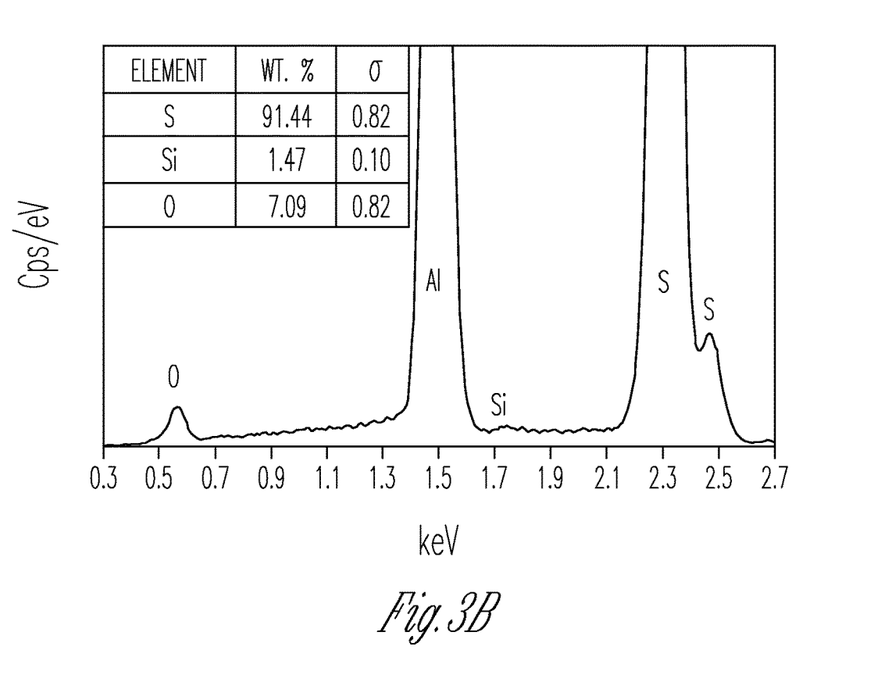

The sulfur content of as-synthesized SCSPs was about 90 wt % based on EDS data from several syntheses (FIG. 3b). For all cyclability plots, the first cycle was run at a C/50 rate, based on the theoretical capacity of 1675 $mAhg^{-1}$, while each subsequent cycle was run at a C/10 rate. This slow current cycling was necessary due to the highly insulating nature of the SCSP structure. Cyclic voltammetry (CV) curves were obtained using a scan rate of 0.1 $mVs^{-1}$. After 50 cycles, the SCSPs maintain a respectable specific discharge capacity of 444.4 $mAhg^{-1}$ (FIG. 4A(a)), which is still significantly higher than that of materials used in industry today.

The conversion $S_8 \rightarrow Li_2S$ is repeatedly allowed to proceed reversibly for several cycles, indicated by the coulombic efficiency stabilizing at ~99%. However, the capacity decay over the first 50 cycles is still substantial, with an average specific capacity loss of 12.2 $mAhg^{-1}$ per cycle from cycle 2 to 50. The CV curve for SCSPs, shown in FIG. 4B(a), highlights typical lithiation and delithiation peaks for Li—S cathodes, where as expected, lithiation decreases slightly and then stabilizes after cycle 2. This is owed to the ultra-low current density for cycle 1 and the thin $SiO_2$ coating, which are both thought to encourage the formation of a stable SEI layer.

As evidenced from the cycling data for SCSPs, capacity fading was still fairly significant for the SCSP cathode, and is most likely due to the encapsulation of an extremely electronically insulating material ($S_8$) with another insulating material ($SiO_2$, band gap ~9 eV). The capacity loss experienced with SCSPs alone was the impetus for the addition of mrGO to the cathode mixture, and study thereof.

According to FIG. 4A(c), the capacity decay of SCSPs is markedly improved with the addition of mrGO. From cycles 2 through 50, an average capacity loss per cycle was only 8.6 $mAhg^{-1}$ was experienced, with an improved Coulombic efficiency of ~99.3%. The CV curve also shows excellent stability of the mrGO-enhanced cathode, exhibiting a more diverse range of redox peaks compared to that of SCSPs alone (FIG. 4B(b)). While the lithiation and delithiation peaks stabilize after the first few cycles, there is also a slight up-field shift in their redox potentials after cycle 1; this shift and subsequent stabilization is likely due to the entrapment of $SiO_2$ and polysulfides between mrGO sheets.

With mrGO as an additive, the $50^{th}$ discharge of SCSPs showed a specific capacity of 763.2 $mAhg^{-1}$. Thus, as depicted in the comparison in discharge capacities in FIG. 4A(c), a result of mrGO and CB as combined conductive additives rather than CB alone was a 318.8 $mAhg^{-1}$ boost, an enormous benefit. In one example, these benefits come from the partial wrapping of the SCSP particles, which allows for intimate contact of conductive medium, rather than small CB particles being randomly dispersed throughout the mixture. An added benefit is the polysulfide shuttle-inhibiting properties of the mrGO; this becomes crucial as the SCSP structure breaks down over a number of cycles.

Notably, sulfur is demonstrating its 3 major voltage plateaus in the charge-discharge plots; the $1^{st}$ and smallest plateau is derived from the solid $Li_2S_8$ species (2.4-2.3V), the $2^{nd}$ and sharpest plateau from the conversion of $Li_2S_8$ to the soluble $Li_2S_6$ species (2.3-2.1V), and finally the longest plateau from the soluble species $Li_2S_{6 \geq x > 2}$ (2.1-2.0V).

The discharge/charge voltage profiles of SCSPs and SCSPs with mrGO were obtained for analyzing the voltage plateau regions. The plateaus of the $1^{st}$ cycle of SCSP cathode are in good agreement with the charge and discharge peak of its respective CV curve (shown in FIG. 4B(c)), with the primary operating region between 2.3 and 2.4V for charging and 2.0 and 2.3V for discharging. The later charges, however, begin experiencing a broader voltage window. For example, the $5^{th}$, $25^{th}$ and $50^{th}$ charges operate between 2.2 and 2.4V, while the discharges remain in the same operating window.

As illustrated in FIG. 4B(d), when mrGO is added, an extended voltage plateau is gained for later cycles, with the discharge/charge capacity stabilizing at about 700 $mAhg^{-1}$ for the $50^{th}$ cycle, in contrast to about 400 $mAhg^{-1}$ for SCSPs alone. The voltage plateaus for the mrGO-enhanced SCSPs also agree with its respective CV curve, and there is also a greater curvature to the plateaus, lending additional capacity to higher voltages. An auxiliary effect of the mrGO additive is the absence of operational voltage reduction, as is seen in the solely SCSP cathode.

The assembly of one example of electrochemical half-cell electrodes involved mixing a 6:3:1 weight ratio of SCSPs, CB, and polyvinylidene fluoride (PVdF) using a mortar and pestle. A slurry was made with N-Methyl-2-pyrrolidone (NMP), which was cast onto high-purity aluminum foil current collectors and placed in a vacuum oven at 60° C. overnight to dry. CR2032-type coin cells were then fabricated with the SCSPs/CB/PVDF composite as the working electrode, microporous polypropylene as the separator (Celgard 2300), and lithium metal foil as the counter electrode.

The electrolyte used was 1M lithium bis(trifluoromethanesulfonyl)imide (LiTFSI) in a 1:1 vol. ratio of 1,3-dioxolane (DOL) and 1,2-dimethoxyethane (DME), and lithium nitrate ($LiNO_3$) as a lithium-passivating additive at a concentration of 0.5 wt %. Cells were prepared in an Ar-filled VAC Omni-lab glovebox, and were tested vs. lithium from 1.7 to 2.8V on an Arbin BT2000. CV data was collected using a Bio-logic VMP3 with a scan rate of 0.1 $mVs^{-1}$. Scanning electron microscopy characterization was performed using an FEI Nova Nano450SEM, an FEI XL30 SEM, and transmission electron microscopy was carried out using a Philips CM300 TEM.

In this study, silica-coated sulfur particles (SCSPs) were synthesized and characterized as a cathode material for Li—S batteries. This novel core-shell structure was fabricated in a facile 2-step wet chemical synthesis. The SCSP cathode showed superior cycling stability when coupled with mrGO as an additive, improving the capacity retention after 50 cycles from 440.8 $mAhg^{-1}$ without mrGO to 763.2 $mAhg^{-1}$ with mrGO. The electrochemical data also shows reduced capacity fading over 50 cycles, from 12.2 $mAhg^{-1}$ per cycle without mrGO to 8.6 $mAhg^{-1}$ per cycle with mrGO.

During cycling. SCSPs are understood to fracture and release active material (Ss), and mrGO helps to contain the ruptured particles, thereby improving cycling stability. By the $50^{th}$ cycle, SCSPs experienced a 318.8 $mAhg^{-1}$ boost in specific discharge capacity with the addition of mrGO. Thus. SCSPs with the addition of mrGO show great promise in the application of low-cost, high energy density battery systems for portable electronics and EVs. Further investigation is needed on the SCSP cathode system, expressly into the silica shell pulverization during cycling.

Figure 5:
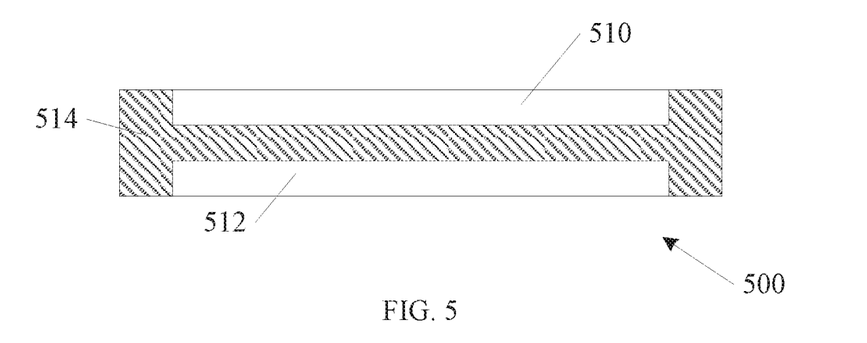
FIG. 5 shows a battery according to an example of the invention.

FIG. 5 shows an example of a battery 500 according to an embodiment of the invention. The battery 500 is shown including an anode 510 and a cathode 512. An electrolyte 514 is shown between the anode 510 and the cathode 512. In one example, the battery 500 is a lithium-ion battery. In one example, one or more electrodes, such as the anode 510 and/or the cathode 512 includes coated sulfur particles as described in examples above. In one example, although the invention is not so limited, the battery 500 is formed to comply with a 2032 coin type form factor.

Figure 6:
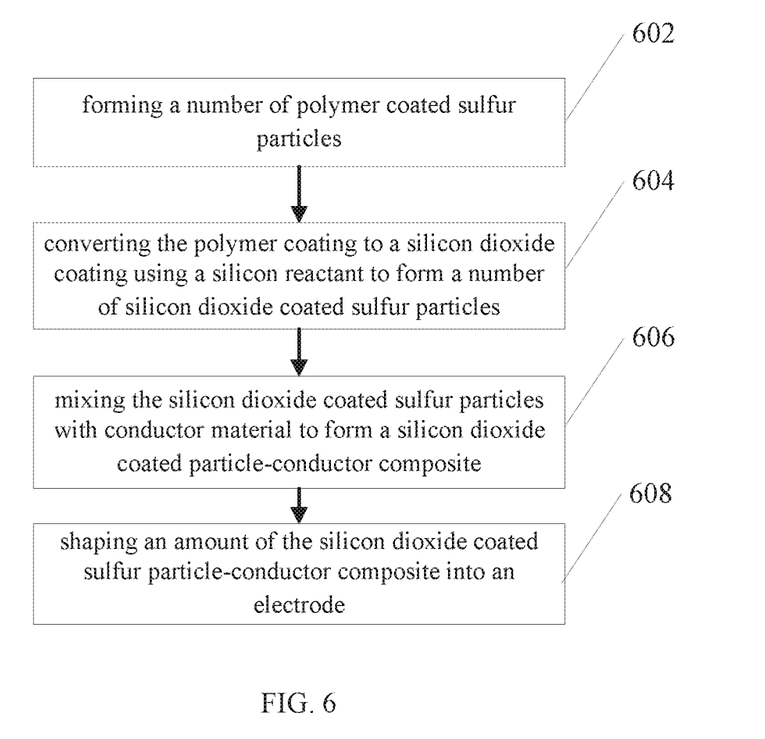
FIG. 6 shows a method of forming an electrode according to an example of the invention.

FIG. 6 shows an example method of forming according to an embodiment of the invention. In operation 602 a number of polymer coated sulfur particles are formed. In operation 604, the polymer coating is converted to a silicon dioxide coating using a silicon reactant to form a number of silicon dioxide coated sulfur particles. In operation 606, the silicon dioxide coated sulfur particles are mixed with conductor material to form a silicon dioxide coated particle-conductor composite. In operation 608 an amount of the silicon dioxide coated sulfur particle-conductor composite is formed into an electrode.

To better illustrate the devices and methods disclosed herein, a non-limiting list of embodiments is provided here:

Example 1 includes a method of forming a battery electrode. The method includes forming a number of polymer coated sulfur particles, converting the polymer coating to a silicon dioxide coating using a silicon reactant to form a number of silicon dioxide coated sulfur particles, mixing the silicon dioxide coated sulfur particles with conductor material to form a silicon dioxide coated particle-conductor composite, and shaping an amount of the silicon dioxide coated sulfur particle-conductor composite into an electrode.

Example 2 includes the method of example 1, wherein forming a number of polymer coated sulfur particles includes forming a number of polyvinylpyrrolidone (PVP) coated sulfur particles.

Example 3 includes any one of Examples 1-2, wherein converting the polymer coating to a silicon dioxide coating using a silicon reactant includes mixing the number of polymer coated sulfur particles with a tetraethyl orthosilicate (TEOS) solution.

Example 4 includes any one of Examples 1-3, wherein mixing the silicon dioxide coated sulfur particles with conductor material includes mixing the silicon dioxide coated sulfur particles with an amount of carbon black.

Example 5 includes any one of Examples 1-4, wherein mixing the silicon dioxide coated sulfur particles with conductor material includes mixing the silicon dioxide coated sulfur particles with an amount of graphene oxide.

Example 6 includes the method of Example 5, wherein mixing the silicon dioxide coated sulfur particles with conductor material includes mixing the silicon dioxide coated sulfur particles with an amount of mildly reduce graphene oxide sheets.

Example 7 includes an electrode. The electrode includes a number of sulfur particles, a silicon dioxide coating substantially surrounding each of the number of sulfur particles, and a conductor mixed with the number of silicon dioxide coated sulfur particles.

Example 8 includes the electrode of Example 7, wherein the conductor includes carbon black.

Example 9 includes the electrode of any one of Examples 7-8, wherein the conductor includes graphene oxide.

Example 10 includes the electrode of any one of Examples 7-9, wherein the conductor includes mildly reduced graphene oxide sheets.

Example 11 includes the electrode of any one of Examples 7-10, wherein the number of sulfur particles are approximately 90 wt % of the electrode.

Example 12 includes the electrode of any one of Examples 7-11, wherein the number of sulfur particles are substantially spherical with a diameter of approximately 700 to 800 nanometers.

Example 13 includes the electrode of any one of Examples 7-12, wherein the silicon dioxide coating is approximately 15-20 nanometers thick.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of forming a battery electrode, comprising:
    forming a number of polymer coated sulfur particles, including adding hydrochloric acid dropwise to sodium thiosulfate pentahydrate and polyvinylpyrrolidone (PVP) to precipitate PVP coated sulfur particles;
    converting the polymer coating to a silicon dioxide coating using a silicon reactant to form a number of silicon dioxide coated sulfur particles with a conforming thin film silicon dioxide coating;
    mixing the silicon dioxide coated sulfur particles with an amount of graphene oxide, and mildly reducing the amount of graphene oxide while mixed with the silicon dioxide coated sulfur particles to form a silicon dioxide coated particle-conductor composite; and
    shaping an amount of the silicon dioxide coated sulfur particle-conductor composite into an electrode.

2. The method of claim 1, wherein forming a number of polymer coated sulfur particles includes forming a number of polyvinylpyrrolidone (PVP) coated sulfur particles.

3. The method of claim 1, wherein converting the polymer coating to a silicon dioxide coating using a silicon reactant includes mixing the number of polymer coated sulfur particles with a tetraethyl orthosilicate (TEOS) solution.

4. The method of claim 1, wherein mixing the silicon dioxide coated sulfur particles includes mixing the silicon dioxide coated sulfur particles with an amount of carbon black.

5. The method of claim 1, wherein mildly reducing the amount of graphene oxide while mixed with the silicon dioxide coated sulfur particles includes reacting with hydrazine.

6. The method of claim 5, wherein mixing the silicon dioxide coated sulfur particles with an amount of graphene oxide includes mixing the silicon dioxide coated sulfur particles with a suspension of graphene oxide in deionized water.

7. The method of claim 6, wherein reacting with hydrazine includes reacting in the deionized water at zero degrees Centigrade.

* * * * *